United States Patent [19]
Katsuyama et al.

[11] Patent Number: 5,475,875
[45] Date of Patent: Dec. 12, 1995

[54] ANTENNA SWITCHING CIRCUIT EMPLOYING FETS FOR REDUCED POWER CONSUMPTION

[75] Inventors: Tsutomu Katsuyama; Hiroshi Ando, both of Tokyo, Japan

[73] Assignee: Oki Electric Industry Co., Ltd., Tokyo, Japan

[21] Appl. No.: 258,633

[22] Filed: Jun. 10, 1994

[30] Foreign Application Priority Data

Jun. 17, 1993 [JP] Japan .................................. 5-146256

[51] Int. Cl.⁶ .................................................. H04B 1/06
[52] U.S. Cl. ........................ 455/275; 455/277.1; 455/78; 333/103; 327/408; 327/427
[58] Field of Search ........................... 455/78–79, 82–83, 455/133, 136, 275, 277.1, 277.2; 333/103, 104; 327/408, 427, 435; 343/876

[56] References Cited

U.S. PATENT DOCUMENTS

| | | | |
|---|---|---|---|
| 4,810,911 | 3/1989 | Noguchi | 333/103 |
| 5,047,674 | 9/1991 | Clark et al. | 455/78 |
| 5,081,706 | 1/1992 | Kim . | |
| 5,193,218 | 3/1993 | Shimo | 333/103 |
| 5,280,633 | 1/1994 | Camiade et al. | 455/79 |

FOREIGN PATENT DOCUMENTS

| | | | |
|---|---|---|---|
| 3108029 | 1/1982 | Germany . | |
| 0101122 | 5/1986 | Japan | 333/103 |
| 2089578 | 6/1982 | United Kingdom . | |
| 2161046 | 1/1986 | United Kingdom . | |
| 9222937 | 12/1992 | WIPO | 333/103 |

Primary Examiner—Edward F. Urban
Assistant Examiner—Andrew Faile
Attorney, Agent, or Firm—Spencer, Frank & Schneider

[57] ABSTRACT

An antenna switching circuit comprises a first amplifier including a first FET receiving a first receive signal from a first antenna at a gate of the first FET, and amplifying the first receive signal, and outputting the amplified signal via a drain of the first FET to an output terminal, and a second amplifier including a second FET receiving a second receive signal from a second antenna at a gate of the second FET, and amplifying the second receive signal and outputting the amplified signal via a drain of the second FET to the output terminal. The first and second FETs are coupled to receive, at their sources, first and second control signals complementary to each other so that one of the FETs is made active while the other is made inactive, depending on values of the first and second control signals. The consumption current is reduced, and in addition, an amplifier in a receiver provided to receive the output of the antenna switching circuit may be omitted.

4 Claims, 3 Drawing Sheets

ANTENNA SWITCHING CIRCUIT EMPLOYING FETS FOR REDUCED POWER CONSUMPTION

BACKGROUND OF THE INVENTION

The present invention relates to an antenna switching circuit used in a diversity receiver in a mobile radio set.

The strength of the electric field received by an mobile radio set fluctuates over a wide range due to fading. In order to avoid the effects of fading, a diversity receiver, shown in FIG. 3 is used. Separately provided antennas 21 and 22 are provided and used to concurrently receive the signal from the base station, and an antenna switching circuit (DIV/SW) 25 controlled by a controller (CPU) 27 selects one of the signals having the higher level, and supplies the selected signal to a receiver 26. The antennas 21 and 22 are configured to exhibit different sensitivities for signals received via different propagation paths. For instance, they are disposed at different heights, or optimized for different frequencies. One of the antennas 21 and 22 are used also for transmission. In the illustrated example, the antenna 21 is used for reception only and is called a receive antenna (R-ANT), while the antenna 22 is used for reception and transmission and is called a transmit/receive antenna (T-R-ANT).

A known the antenna switching circuit (DIV/SW) 25, is comprised of PIN (p-type/intrinsic/n-type) diodes FIG. 4 is a circuit diagram showing the antenna switching circuit employing PIN diodes D31 to D34.

Referring to FIG. 4, a receive signal received by a receive antenna (R-ANT) shown in FIG. 3 is applied to an input terminal 31, and a receive signal received by a transmit/receive antenna (T-R-ANT) is applied to an input terminal 32. The receive signal selected by the switching circuit is sent out via an output terminal 33 to a receiver 26 shown in FIG. 3. Control signals are applied to terminals 34, 35. When a voltage is applied in a forward direction to a PIN diode, a current flows and the resistance is decreased. When a voltage is applied in a reverse direction to a PIN diode, a current does not flow and tile resistance is increased. The impedance of the capacitors C31 to C38 are set to be sufficiently small at the operating frequency.

When a control signal of a high level, e.g., 5 V, is applied to the terminal 34 and a control signal of a low level, e.g., 0 V, is applied to the terminal 35, a forward voltage is applied to the PIN diodes D32 and D33 so that a current flows through them and their resistances are low, while a reverse voltage is applied to the PIN diodes D31 and D34 so that no current flows through them and their resistances are high. Accordingly, the path between nodes N0 and N2 is conductive, while the path between the nodes N0 and N1 is nonconductive. The receive signal applied to the input terminal 32 is therefore output via the output terminal 33. Conversely, when a control signal of 5 V is applied to the terminal 35 and a control signal of 0 V is applied to the terminal 34, a forward voltage is applied to the PIN diodes D31 and D34 so that a current flows through them and their resistances are low, while a reverse voltage is applied to the PIN diodes D32 and D33 so that no current flows through them and their resistances are high. Accordingly, the path between nodes N0 and N1 is conductive, while the path between the nodes N0 and N2 is nonconductive. The receive signal applied to the input terminal 31 is therefore output via the output terminal 33.

In order to increase the reception sensitivity of the diversity receiver, it is necessary to minimize the insertion loss of the antenna switching circuit (DIV/SW) 25 provided in front of the receiver 26.

In order to minimize the insertion loss of the antenna switching circuit of the configuration shown in FIG. 4, it is necessary to reduce the forward resistances of the PIN diodes D31 and D33, and as a result it is necessary to cause a current of a large value, such as 5 mA, to flow through the PIN diodes D31 and D33. This is a disadvantage in a mobile radio set in which the power supply is formed of a small-sized battery.

Moreover, in the above-described antenna switching circuit, the insertion loss cannot be eliminated, and when it is provided in front of the receiver 26 shown in FIG. 3, reduction in the reception sensitivity cannot be avoided.

SUMMARY OF INVENTION

The present invention has been made to solve the above problems, and its object is to provide an antenna switching circuit in which the consumption current is small and which is not associated with the reduction in the reception sensitivity.

An antenna switching circuit according to the invention comprises:

a first amplifier including a first FET (T1) receiving a first receive signal from a first antenna (41) at a gate of said FET, and amplifying said first receive signal, and outputting the amplified signal via a drain of said first FET to an output terminal (13); and a second amplifier including a second FET (T2) receiving a second receive signal from a second antenna (42) at a gate of said second FET, and amplifying said second receive signal and outputting the amplified signal via a drain of said second FET to said out:put terminal (13);

said first and second FETs being coupled to receive, at their drains, first and second control signals complementary to each other so that one of them is made active while the other is made inactive depending on values of said first and second control signals.

Each of tile first and second amplifiers amplifies the receive signal when it is active, and attenuates the receive signal when it is inactive, so that by making one of the first and second amplifiers active and the other inactive by means of complementary control signals, they can be made to operate as a switch.

Because each of the first and second amplifiers comprises an FET, the drain-source current in the inactive state is small, and tile noise factor is also small.

These and other objects of the present invention will become more readily apparent from the detailed description given hereinafter. However, it should be understood that the detailed description and specific examples, while indicating preferred embodiments of the present invention, are given by way of illustration only, since various changes and modifications within the sprit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitive of the present invention and wherein.

DETAILED DESCRIPTION OF THE PREFERRED EMBODIMENTS

Figure 1:
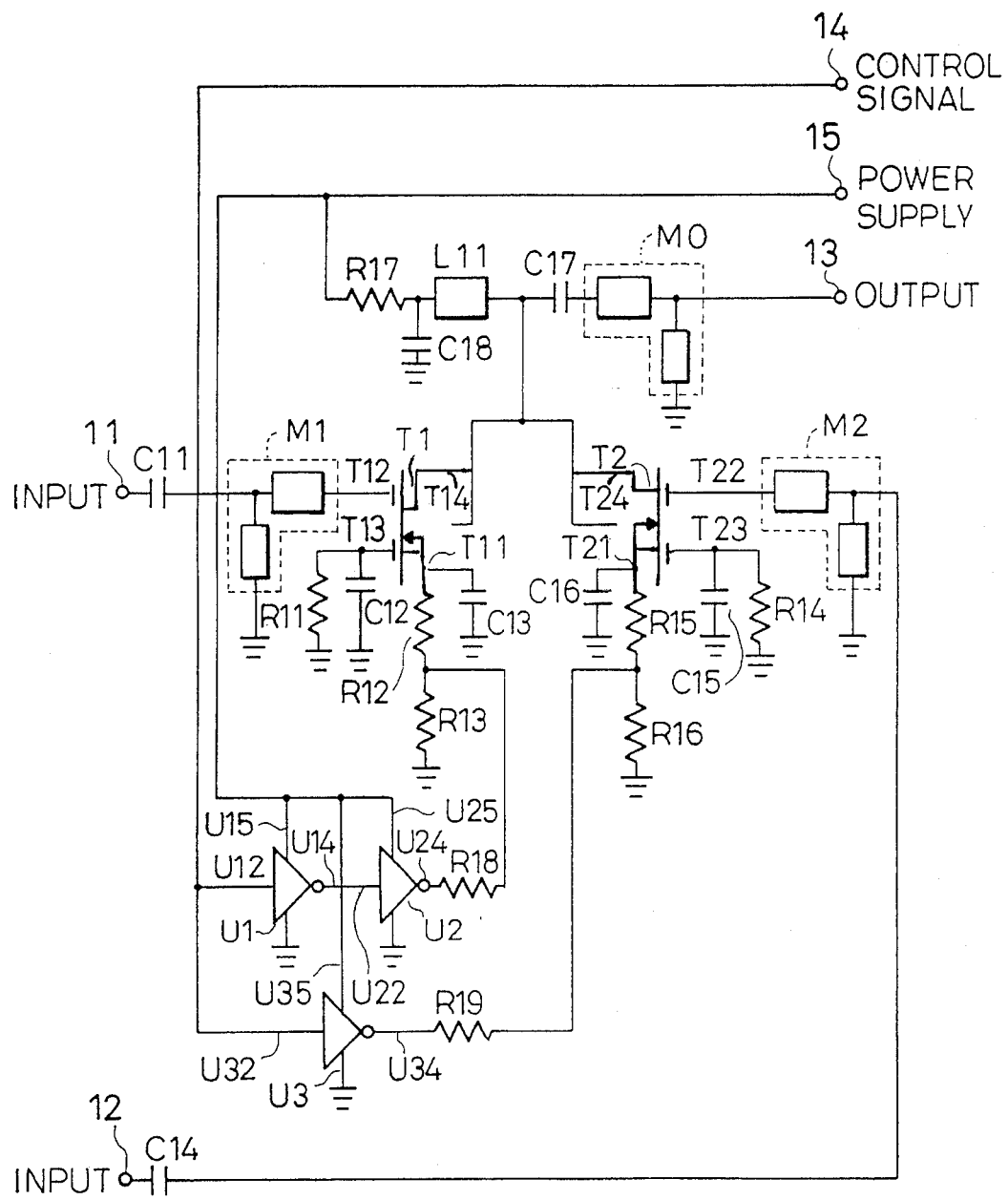
FIG. 1 is a circuit diagram showing an embodiment of the invention.

FIG. 1 is a circuit diagram of an embodiment of the invention.

Referring to FIG. 1, the antenna switching circuit of this embodiment comprises first and second amplifiers respectively comprising dual-gate GaAs FETs T1 and T2. The antenna switching circuit also comprises inverters U1 to U3 provided to receive a control signal and produce complementary control signals. The FET T1 has its first gate T12 connected via an impedance matching circuit M1 and a capacitor C11 to an input terminal 11 to which a receive signal received by a first antenna (41, in FIG. 2) is applied, and has its second gate T13 connected via a capacitor C12 for bypassing high-frequency components and a resistor R11 to ground, and has its source T11 connected via a capacitor C13 for bypassing high-frequency components and series connected resistors R12 and R13 to ground. Similarly, the FET T2 has its first gate T22 connected via an impedance matching circuit M2 and a capacitor C14 to an input terminal 12 to which a receive signal received by a second antenna (42, in FIG. 2) is applied, and has its second gate T23 connected via a capacitor C15 for bypassing high-frequency components and a resistor R14 to ground, and has its source T21 connected via a capacitor C16 for bypassing high-frequency components and series connected resistors R15 and R16 to ground. Drains T14 and T24 of the FETs T1 and T2 are connected to each other, and connected via a capacitor C17 and an impedance matching circuit M0 to an output terminal 13 connected to a receiver (46, in FIG. 2).

Inputs U12 and U32 of the inverters U1 and U3 are both connected to a terminal 14 to which a control signal is applied. An output U14 of the inverter U1 is connected to an input U22 of the inverter U2, an output U24 of the inverter U2 is connected via a resistor R18 to a junction between the resistors R12 and R13, and an output U34 of the inverter U3 is connected via a resistor R19 to a junction between the resistors R15 and R16. Moreover, for supplying power to the FETs T1, T2, and the inverters U1 to U3, drains T14 and T24 of the FETs T1 and T2 are connected via a chalk coil L11 and a resistor R17 to a power supply terminal 15, and power supply terminals U15, U25 and U35 of the inverters U1 to U3 are directly connected to the power supply terminal 15.

The operation of the present embodiment will next be described with reference to FIG. 1.

The FET T1 is so set as to function as an amplifier when the output U24 of the inverter U2 is Low (e.g., 0 V), and to function as an attenuator when the output U24 of the inverter U2 is High (e.g., 5 V). For instance, the values of the resistors R12, R13 and R18 are so selected as to make the drain-source current of the FET T1 to be about 2 mA and the drain-source voltage to be about 4 V when the output of the inverter U2 is Low, and to make the drain-source current of the FET T1 to be 0 mA when the output of the inverter U2 is High, so that the FET T1 is made to operate either as an amplifier or an attenuator.

Similarly, the FET T2 is so set as to function as an amplifier when the output U34 of the inverter U3 is Low, and to function as an attenuator when the output U34 of the inverter U2 is High. For instance, the values of the resistors R15, R16 and R19 are so selected as to make the drain-source current of the FET T2 to be about 2 mA and the drain-source voltage to be about 4 V when the output U34 of the inverter U3 is Low, and to make the drain-source current of the FET T2 to be 0 mA when the output U34 of the inverter U3 is High, so that the FET T2 is made to operate as an amplifier or an attenuator.

When the control signal input to the terminal 14 is Low, the output of the inverter U2 is Low, and the output of the inverter U3 is High, so the FET T1 operates as an amplifier and the FET T2 operates as an attenuator. The receive signal input to the input terminal 11 is amplified by the FET T1, and output via the output terminal 13, and the receive signal input to the input terminal 12 is attenuated by the FET T2 and does not appear at the output terminal 13. The output impedance of the drain T24 of the FET T2 is sufficiently large compared with the load impedance, so that the signal amplified by the FET T1 is not affected by the output impedance of the drain T14 of the FET T2, and it is possible to make D/U (D represents the level of the signal amplified by the FET T1 and appearing at the drain T14, and U represents the signal attenuated by the FET T2 and appearing at the drain T24) large (for instance, D/U can be made to be about 30 dB at 880 MHz).

When the control signal input to the terminal 14 is High, the output of the inverter U2 is High, and the output of the inverter U3 is Low, so the FET T1 operates as an attenuator and tile FET T2 operates as an amplifier. The receive signal input to the input terminal 12 is amplified by the FET T2, and output via the output terminal 13, and the receive signal input to the input terminal 11 is attenuated by the FET T1 and does not appear at the output terminal 13.

In this way, according to the present embodiment, the control signal input to the terminal 14 is made Low or High to select one of the receive signal input via the input terminal 11 and the receive signal input via the input terminal 12, and to output the selected receive signal via the output terminal 13. The consumption current at the FETs T1 and T2 is small compared with the consumption current at the diodes D31 to D34 in the conventional antenna switching circuit.

In the embodiment described, the dual-gate GaAs FETs T1 and T2 are formed of GaAs FET. But FETs having equivalent characteristics may be used instead. For instance, single-gate GaAs FETs, or dual-gate or single-gate Si FETs may also be used.

Figure 2:
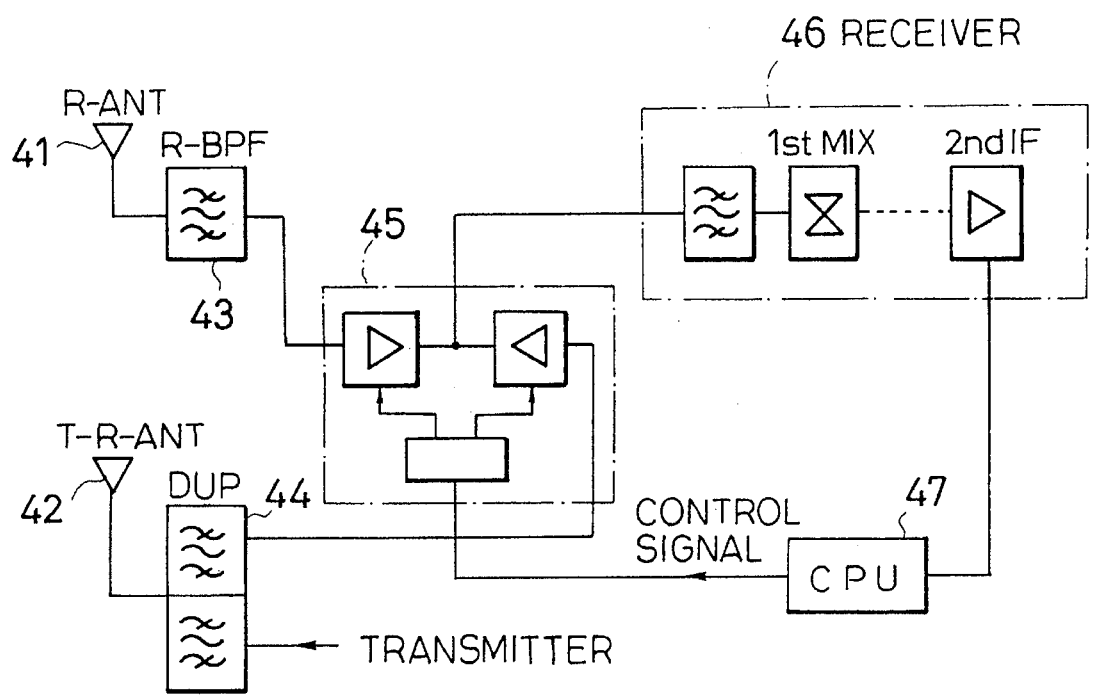
FIG. 2 is a block diagram showing diversity receiver employing the antenna switching circuit of FIG. 1.

FIG. 2 is a block diagram showing a diversity receiver employing the antenna switching circuit described above.

Figure 3:
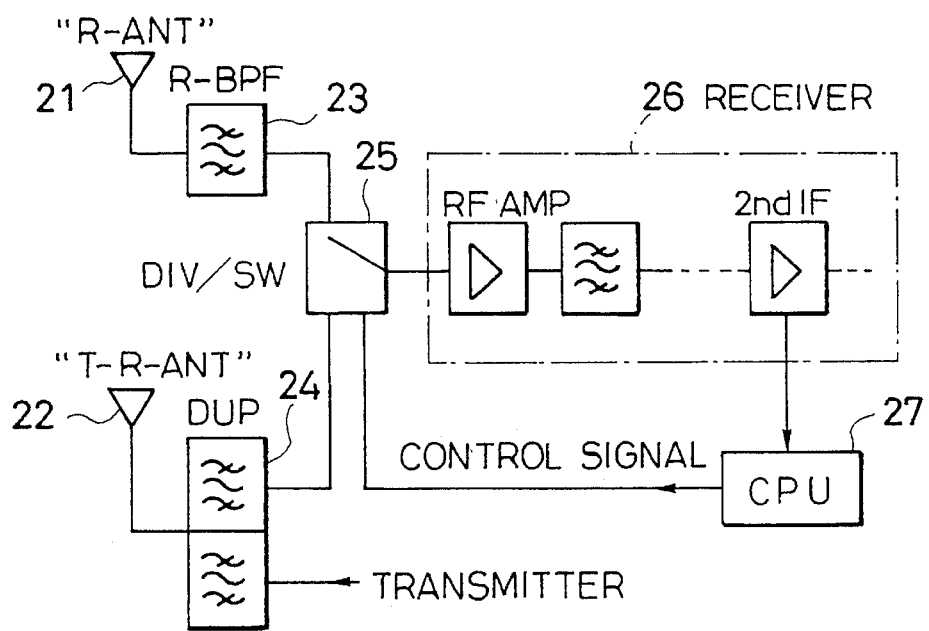
FIG. 3 is a block diagram showing a conventional diversity receiver.

In the same way as in the conventional diversity receiver shown in FIG. 3, the antenna switching circuit 45 of this embodiment is coupled to the antenna 41 and also to a transmit/receive antenna (T-R-ANT) 42. A bandpass filter R-BPF is inserted between the receive antenna 41 and the switching circuit 45. A duplexer DUP is inserted between the transmit/receive antenna 42 and the switching circuit 45. The function of the duplexer DUP is to route the receive signal from the antenna 42 to the switching circuit 45, and to route the transmit signal from the transmitter (not illustrated) to the antenna 42. The output of the switching circuit 45 is applied to a receiver 46. A controller 47 provides the control signal (applied to the terminal 14 in FIG. 1) and controls the switching circuit 45 by means of this control signal.

The value of the control signal (determining which of the FETs T1 and T2 should be made conductive) which is produced in a normal operation mode is determined by the result of a test carried out in a test mode. In the test mode, the outputs of the antennas 41 and 42 are successively selected and their magnitudes are measured, stored, and compared. The result of comparison, indicating which of the outputs of the antennas 41 and 42 has a greater magnitude is stored and used for determining the value of the control signal during the subsequent use of the radio set (during the operation in the normal mode).

The testing may be conducted when the power supply to the radio set is turned on, or when it is detected that the orientation of the radio set is changed substantially (over a predetermined angle), or when the level of the signal selected and output from the switching circuit 45 is found to have fallen substantially (below a predetermined level).

Figure 4:
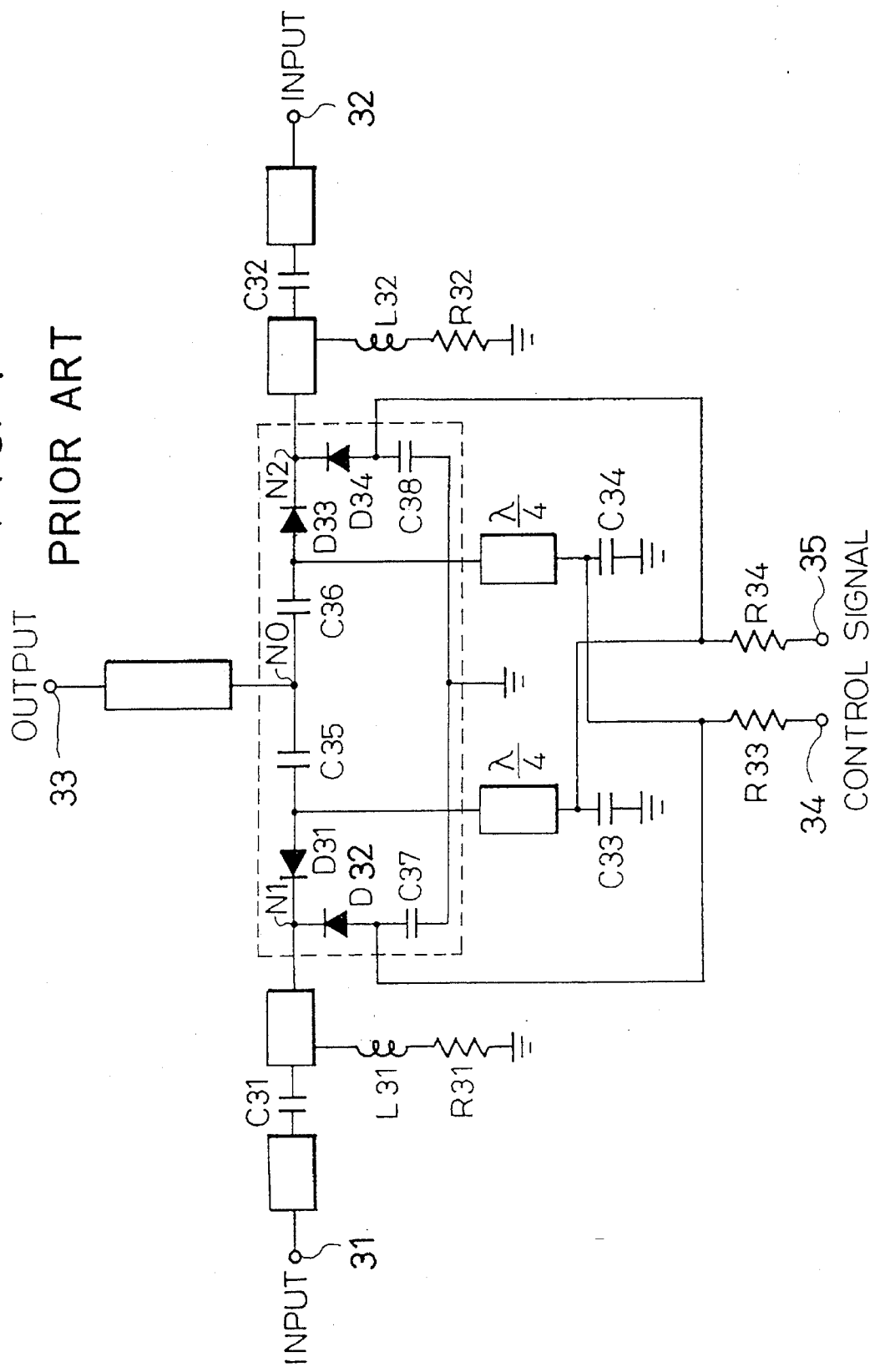
FIG. 4 is a circuit diagram showing a conventional antenna switching circuit.

The conventional antenna switching circuit shown in FIG. 4 has an insertion loss, and causes degradation in the noise factor and reduction in the reception sensitivity when the antenna switching circuit is provided in front of a receiver 26 as shown in FIG. 3. In contrast, the antenna switching circuit of the present invention shown in FIG. 1 employs GaAs FETs, and a gain of about 10 dB and a noise factor of about 2 dB at 880 MHz band are realized. When the antenna switching circuit of this embodiment is provided in front of a receiver 46 as shown in FIG. 2, the noise factor of the receiving circuitry is dependent mostly on the antenna switching circuit section 45, and the reception sensitivity is much higher than if the conventional antenna switching circuit 25 is used.

The antenna switching circuit according to the embodiment shown in FIG. 1 has a gain for the receive signal, so that amplifier in the front stage of the receiver 46 may be omitted as shown in FIG. 2.

As has been described in detail, the FETs are used as elements to turn on and off the receive signal to realize an antenna switching circuit which has a reduced consumption current and a small noise factor, and also has the amplification function.

Accordingly, by employing the antenna switching circuit according to the invention in a diversity receiver, the reception sensitivity characteristics have been improved and the consumption current of the device can be reduced. This is advantageous in a mobile radio set in which power is supplied from a small-sized battery.

What is claimed is:

1. An antenna switching circuit comprising:

a first amplifier including a first FET receiving a first receive signal from a first antenna at a gate of said first FET, and amplifying said first receive signal, and outputting the amplified first receive signal via a drain of said FET to an output terminal; and a second amplifier including a second FET receiving a second receive signal from a second antenna at a gate of said second FET, and amplifying said second receive signal and outputting the amplified second receive signal via a drain of said second FET to said output terminal;

said first and second FETs being coupled to receive, at their sources, first and second control signals complementary to each other so that one of said first and second FETS is made active while the other is made inactive depending on values of said first and second control signals.

2. The antenna switching circuit according to claim 1, wherein said drains of said first and second FETs are connected to each other, and coupled to said output terminal.

3. The antenna switching circuit according to claim 1, wherein said source of said first FET is coupled to ground via a first pair of resistors connected in series with each other, said source of said second FET is coupled to ground via a second pair of resistors connected in series with each other, said first control signal is applied to a junction between said first pair of resistors, and said second control signal is applied to a junction between said second pair of resistors.

4. The antenna switching circuit according to claim 1, further comprising a chalk coil, and a resistor connected in series with the chalk coil between a power supply and the drains of the FETs.

* * * * *